(12) United States Patent
Folio (10) Patent No.: US 6,483,568 B1
(45) Date of Patent: Nov. 19, 2002

(54) SUPPLEMENTAL AUDIO CONTENT SYSTEM FOR A CINEMA AND RELATED METHODS

(75) Inventor: Richard J. Folio, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/896,937

(22) Filed: Jun. 29, 2001

(51) Int. Cl.⁷ ............................................... G03B 31/00
(52) U.S. Cl. ........................................................ 352/20
(58) Field of Search ............................ 352/19, 20, 23, 352/12

(56) References Cited

U.S. PATENT DOCUMENTS

| | | | |
|---|---|---|---|
| 4,027,958 A | * 6/1977 | Shigeta et al. | 352/17 |
| 4,389,679 A | 6/1983 | Missan et al. | 360/12 |
| 4,758,908 A | 7/1988 | James | 360/61 |
| 4,845,751 A | * 7/1989 | Schwab | 381/105 |
| 5,055,939 A | * 10/1991 | Karamon et al. | 360/13 |
| 5,386,255 A | 1/1995 | Beard et al. | 352/5 |
| 5,553,221 A | 9/1996 | Reimer et al. | 395/154 |
| 5,596,705 A | 1/1997 | Reimer et al. | 395/326 |
| 5,751,398 A | * 5/1998 | Beard | 352/15 |
| 5,798,818 A | 8/1998 | Derderian et al. | 352/31 |
| 5,844,636 A | 12/1998 | Joseph et al. | 348/845 |
| 5,940,148 A | 8/1999 | Joseph et al. | 348/845 |
| 6,072,760 A | 6/2000 | Shirasu | 369/100 |
| 6,141,530 A | 10/2000 | Rabowsky | 455/3.1 |
| 6,211,940 B1 | 4/2001 | Seagrave et al. | 352/11 |
| 6,263,505 B1 | * 7/2001 | Walker et al. | 725/110 |

OTHER PUBLICATIONS

TheatreVision, www.rpinternational.org/theatrevision.htm (May 30, 2001) pp. 1–2.*

Dr. James Clark, www.grassvalleygroup.com/mkts/dcinema/IDCF–paper.html, "Digital Server Technology and the Digital Cinema Revolution," (May 30, 2001) pp. 1–10.

Joseph Hall, Dolby Laboratories, Inc., "Surround Sound Past, Present, and Future," pp. 1–5.

www.smpte.org, *Society of Motion Picture and Televison Engineers*, "Setting the Standard in Motion Imaging," pp. 1–13.

S.A. Morley, et al., *Presented at the 2000 142$^{nd}$ SMPTE Technical Conference, Pasadena, California*, "Balancing Technology in Digital Cinema Systems," (Oct. 19, 2000), pp. 1–23.

M. Karagosian, www. mkpe.com/articles/Digital_audio_in_in_Dc/digital_audio_in_dc.htm, "Digital Audio in Digital Cinema," (*Published in the Sep. 2000 issue of Film Journal*), pp. 1–2.

* cited by examiner

*Primary Examiner*—Russell Adams
*Assistant Examiner*—D. Ben Esplin
(74) *Attorney, Agent, or Firm*—Allen, Dyer, Doppelt, Milbrath & Gilchrist, P.A.

(57) ABSTRACT

A supplemental audio content system may include a storage device for storing supplemental audio content, a time tagger cooperating with a clock for generating time tagged identification data based upon identification data from the motion picture film during playing thereof, and a synchronizer for synchronizing playing of the supplemental audio content with playing of a motion picture film and based upon the time tagged identification data. The supplemental audio content may supplement the primary or main movie soundtrack. The supplemental audio content may include spoken words and be devoid of music or sound effects. For example, the supplemental audio content may comprise alternate language audio content, or may comprise descriptive narrative audio content, such as to assist the sight impaired.

44 Claims, 5 Drawing Sheets

SUPPLEMENTAL AUDIO CONTENT SYSTEM FOR A CINEMA AND RELATED METHODS

FIELD OF THE INVENTION

The present invention relates to entertainment systems and methods, and more particularly, to supplemental audio content systems and methods for cinemas of a cineplex.

BACKGROUND OF THE INVENTION

Motion pictures are commonly shown in cineplexes which include up to twenty or more individual cinemas. Each cinema includes a movie patron seating area, a projection screen and a projector for displaying the motion picture on the screen. Sound systems are also highly developed, and multi-channel soundtracks are typically played along with the motion picture. The soundtrack information in the past has been provided typically from analog tracks adjacent the motion picture frames of the film. A number of cinemas still use these analog soundtracks, however, equipment to provide higher quality digital soundtracks has also been developed and is in use.

For example, U.S. Pat. No. 6,072,760 to Shirasu, discloses the Sony Digital Dynamic Sound technology wherein an S track is provided to the left of the left perforations and a P track is provided to the right of the right perforations of the motion picture. The sound information is thus digitally encoded as a pattern of rectangular dots or pits 22.5 microns by 24 microns.

U.S. Pat. No. 6,211,940 B1 discloses motion picture film wherein digital sound information is stored in the space between a line or perforations on the same side of the film as the analog audio soundtrack. Since the information may be lost due to wear or mechanical damage, the system may select the analog track if the digital information is corrupted.

Along these lines, U.S. Pat. No. 5,386,255 to Beard et al. discloses a digital sound system for motion picture films wherein a digital time code is provided on the film. The digital time code is read during playing of the film, and, together with zero crossing data from the power line, is used to synchronize a digital soundtrack stored on a compact disk or digital audio tape. Accordingly, the film can be played back in theaters using either the analog or digital sound tracks.

U.S. Pat. No. 5,055,939 to Karamon et al. discloses another approach to compatibility for analog and digital formats. More particularly, the patent discloses an approach that does not require synchronizing tracks, codes, markers or time codes or other extrinsic data to be recorded on the film. Instead the standard audio itself, from the film, provides the information that controls the timing of the higher quality auxiliary sound source.

Although many approaches to supplemental audio are directed toward providing a higher quality soundtrack, the Karamon et al. patent, for example, also discloses that alternate languages can be synchronized to the higher quality auxiliary sound source. These translations would be available for selection for listening by a cinema audience or by segments of the audience sitting in preselected seating areas having listening devices assigned to respective languages.

Another category of supplemental audio content is offered under the TheatreVision program created by the founding president of RP International, a non-profit organization fighting retinitis pigmentosa (RP), and other blinding, degenerative eye diseases. TheatreVision makes films accessible to the visually challenged by incorporating a special soundtrack for feature films that runs concurrently with the dialogue of the picture. This track provides a descriptive narration of what is being shown on the screen, so that those without sight can still experience the medium of motion pictures. Over the next few years, plans call for these special narrative tracts to be heard via headsets in theaters all over the United States.

As motion picture technology continues to progress, there are plans for distribution and presentation of motion picture entertainment entirely in digital format, that, is, without the current film with frames, etc. Unfortunately, a typical motion picture may require terabytes of digital data. Moreover, digital projectors are very costly and still may require further technical development to be more compatible with existing film-based projectors. Accordingly, migration to an all-digital format may be many years away. An all digital approach may readily accommodate supplemental audio content which can be stored along with the picture data and main soundtrack data. In the meantime, however, supplemental audio content distribution and presentation in cinemas is severely hampered and complicated by requiring compatibility with existing motion picture film equipment and formats.

SUMMARY OF THE INVENTION

In view of the foregoing background, it is therefore an object of the present invention to provide a system and method for efficiently and economically providing supplemental audio content to movie patrons in cinemas using motion picture film.

This and other objects, features and advantages in accordance with the present invention are provided by a supplemental audio content system comprising a storage device for storing the supplemental audio content, a time tagger cooperating with a clock for generating time tagged identification data based upon identification data from the motion picture film during playing thereof, and a synchronizer for synchronizing playing of the supplemental audio content with playing of a motion picture film and based upon the time tagged identification data. The supplemental audio content may supplement the primary or main movie soundtrack. The supplemental audio content may include spoken words and be devoid of music or sound effects. For example, the supplemental audio content may comprise alternate language audio content, or may comprise descriptive narrative audio content, such as to assist the sight impaired.

The synchronizer may play the supplemental audio content at a play rate based upon the time tagged identification data to synchronize with playing of the motion picture film. More particularly, the synchronizer may include a time base generator for generating a time base signal based upon the time tagged identification data. The synchronizer may also include an output stage for playing the supplemental audio content at a rate based upon the time base signal. Further, the synchronizer may include a time base correction controller for adjusting the time base generator based upon the time tagged identification data.

The synchronizer may also skip ahead or wait while playing the supplemental audio content based upon the time tagged identification data to synchronize with playing of the motion picture film, especially when, for example, splicing may have deleted or added a number of film frames. For example, the system may include a preprocessor for preprocessing the supplemental audio content to identify quiet portions between adjacent live portions. Accordingly, the synchronizer may include a sample formatter for extending or reducing quiet portions during playing of the supplemental audio content. To reduce noise, the sample formatter may hold a prior sample during extension of a quiet portion.

The identification data may include at least one of a reel identifier, a frame identifier, and a frame portion identifier. In accordance with conventional DOLBY® formatted films, for example, a packet of data is output during playing of the film which provides the identification information at a rate of four packets per frame. Of course, other similar data may also be used.

In accordance with another aspect of the invention, the system may include an interface for downloading the supplemental audio content via the Internet, satellite, or a point-to-point link, for example. In other embodiments, disks, tapes or other media storing the supplemental audio content may be physically delivered to each cinema.

The supplemental audio content system may further comprise a plurality of earphones to be worn by movie patrons and operatively connected to the synchronizer. For example, the system may further include a wireless transmitter connected to the synchronizer, and at least one wireless receiver connected to the plurality of earphones. In other words, the supplemental audio content may be delivered wirelessly to earphones worn by the movie patrons. This facilitates installation of the system in an existing cinema without requiring expensive wiring modifications.

The plurality of earphones may comprise a plurality of open field earphones. Accordingly, the movie patrons may hear the music and dialogue of the soundtrack of the movie along with the supplemental audio content.

A method aspect of the invention is for providing supplemental audio content during playing of a motion picture film including identification data thereon. The method preferably comprises generating time tagged identification data based upon a clock and based upon the identification data from the motion picture film during playing thereof, and synchronizing playing of the supplemental audio content with playing of the motion picture film and based upon the time tagged identification data.

Synchronizing may comprise playing the supplemental audio content at a play rate based upon the time tagged identification data to synchronize with playing of the motion picture film. In addition, synchronizing may include skipping ahead or waiting while playing the supplemental audio content based upon the time tagged identification data.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
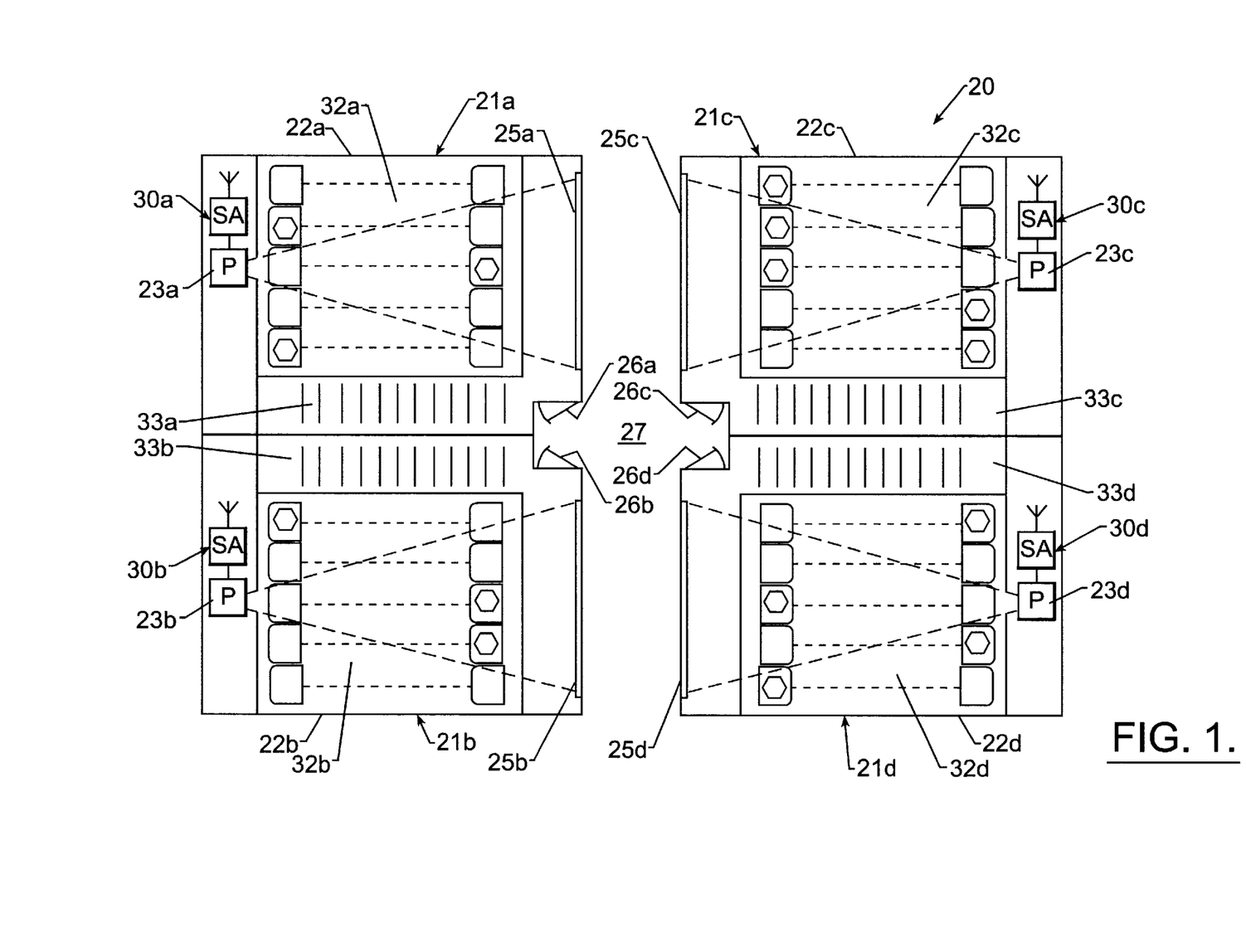
FIG. 1 is a schematic plan view of a cineplex illustratively including four cinemas, each cinema including the supplemental audio content system in accordance with the present invention.

Referring initially to FIG. 1, the supplemental audio content system in accordance with the present invention may be used in a cineplex 20 including a plurality of individual cinemas 21a–21d. Indeed, in the illustrated embodiment of the cineplex 20, each of the cinemas 21a–21d includes a respective supplemental audio content system 30a–30d. Each of the supplemental audio content systems 30a–30d is connected to a respective movie film projector 23a–23d. In other embodiments, not all of the cinemas 21a–21d need be so equipped as will be appreciated by those skilled in the art. The number of cinemas 21 in a cineplex 20 may vary, with twenty or more cinemas not uncommon.

Each of the cinemas 21a–21d includes a respective room 22a–22d with a screen 25a–25d at the forward wall thereof to display the projected movie image. The rooms 22a–22d illustratively include doors 26a–26d which open into a common hallway. Stairs 33a–33d lead alongside the illustrated seating areas 32a–32d as will be appreciated by those skilled in the art. Of course, other room and seating configurations are possible and contemplated by the present invention.

A number of the movie patrons may be interested in some form of supplemental audio content, such as the descriptive narrative audio to aid the sight-impaired, and/or alternative language audio. Accordingly, the hexagons in FIG. 1 are used to schematically indicate those movie patrons using the supplemental audio content system, such as by using the movie patron unit 50 as will be described in greater detail below.

Figure 2:
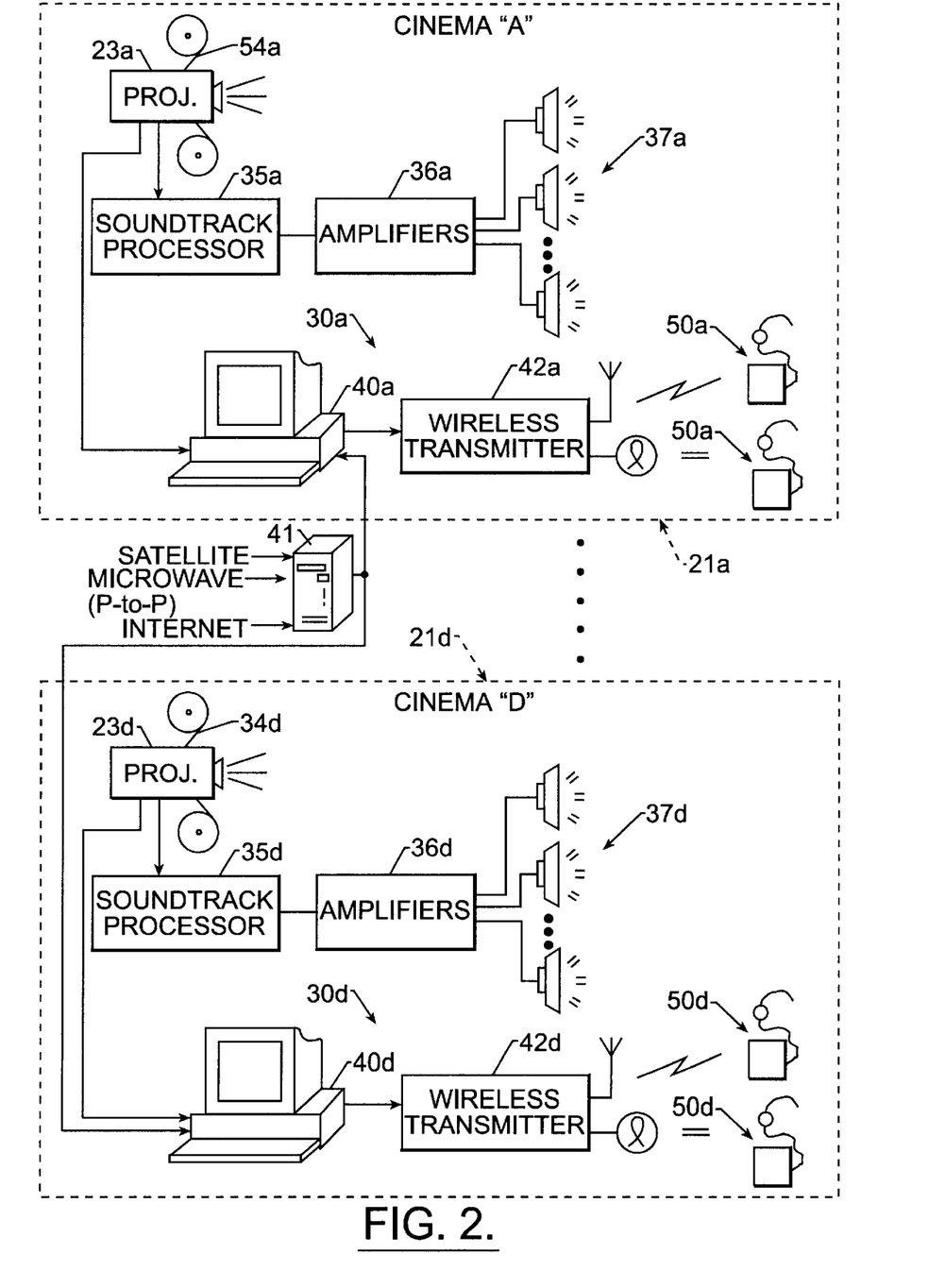
FIG. 2 is a schematic diagram of the supplemental audio content system and related equipment as shown in FIG. 1 for two cinemas.

Referring now additionally to FIG. 2, further details of the respective supplemental audio content systems and other related equipment for two of the cinemas 21a, 21d are now described. Each cinema 21a, 21d includes a projector 23a, 23d for playing a respective motion picture film 34a, 34d.

Each projector 23a, 23b may be of the type that uses DOLBY® processing to produce a bitstream of identification data during playing. In particular, the identification information may include at least one of a reel identification, a frame identification, and a frame portion identification. For example, the reel may be identified with a number, such as reel 6, and the frame and frame portion may be identified with a continuous running number count or film block number. In view of the typical number of frames, and since each frame may be divided into four portions, the block number may range from 0 to about 260,000, depending on the length of the motion picture.

Digital data packets may be encoded in two-dimensional blocks, with four blocks for each picture frame, for example, on the film. Since twenty-four frames are commonly shown per second, 96 data packets are output per second. Each data packet may include 32 bytes of identification information. Further details regarding the two-dimensional encoding and reading are disclosed in U.S. Pat. No. 6,211,940, the entire contents of which are incorporated herein by reference. Of course, those of skill in the art will appreciate that other data formats are also contemplated by the invention.

The respective digitally encoded soundtrack information may be processed by the soundtrack processors 35a, 35d. The soundtrack processors 35a, 35d, in turn are connected to respective amplifiers 36a, 36d which drive the sets of speakers 37a, 37d in the cinemas 21a, 21d. These components are conventional and need no further discussion herein.

In the illustrated embodiment, a supplemental audio content player in the form of a personal computer 40a, 40d is provided in each cinema 21a, 21d, such as in the projection room, for example, and as part of the supplemental audio content system 30a, 30d. As will be described in greater detail below, the personal computers 40a, 40d may be used in some embodiments to provide the signal processing to synchronize playing of the respective supplemental audio content with the playing of the motion picture film 34a, 34d.

The personal computers 40a, 40d are also illustratively connected to a common server 41. The common server 41 may be used to receive the supplemental audio content via the Internet in some embodiments. This content pushed via the Internet may be stored on the server 41 for later playing, or may be preprocessed and stored as described in greater detail below.

The supplemental audio content can also be received via satellite distribution (point-to-multipoint) or via a point-to-point communications link, eg. microwave link, as also schematically illustrated. Of course, in other embodiments, the server 41 may acquire the supplemental audio content as data stored on digital disks, digital tapes, or other similar physically transported media.

The server 41 is illustratively connected to each of the projection room personal computers 40a, 40d, such as via a wired or wireless local area network (LAN) as will be readily appreciated by those skilled in the art. As will also be appreciated by those skilled in the art, the server 41 may not be needed in other embodiments.

One important aspect is that the supplemental audio content signals during playing can be distributed or delivered to movie patrons in the cinema via a wireless communications link. More particularly, as schematically shown in FIG. 2, each personal computer 40a, 40d may be connected to a respective wireless transmitter 42a, 42d. The wireless transmitters 42a, 42d then communicate with corresponding wireless receivers in the respective movie patron units 50a, 50d as will also be described in greater detail below. The wireless link may be infrared or radio frequency (RF) as also described in greater detail below. These approaches may be employed to reduce the likelihood of interference between adjacent cinemas 21a–21d in the cineplex 20.

Figure 3:
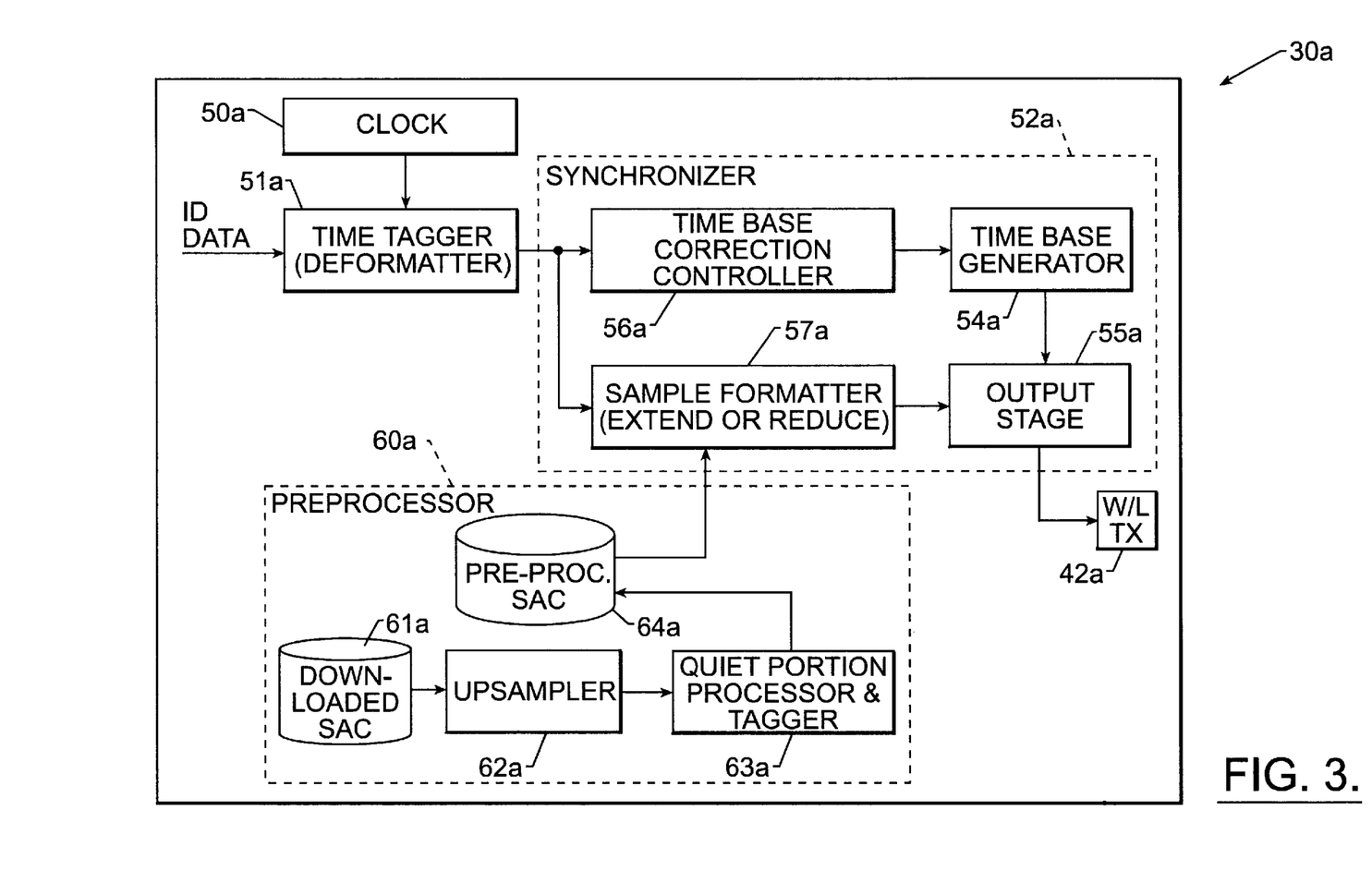
FIG. 3 is a more detailed schematic diagram of a portion of the supplemental audio system as shown in FIG. 2.

Referring now additionally to FIG. 3, various processing steps and portions of a supplemental audio content system 30a are now described. For clarity of explanation, only a single system 30a will be described in detail, and those of skill in the art will recognize that the other systems in the cineplex 20 may the same or similar.

The system 30a includes a clock 50a connected to the time tagger 51a. The clock 50a may be the clock of the personal computer 40a or derived therefrom, as such provides an accurate "wall clock" source for further processing. The time tagger 51a deformats the identification data packets output from the projector 23a. The time tagger 51a also time tags or associates with the data, a time based upon the clock 50a. In other words, the time tagger 51a cooperates with the clock 50a for generating time tagged identification data based upon the identification data from the motion picture film 34a during playing thereof.

The time tagger 51a is illustratively connected to a synchronizer 52a for synchronizing playing of the supplemental audio content with playing of the motion picture film 34a and associated soundtrack and based upon the time tagged identification data. More particularly, the synchronizer 52a may play the supplemental audio content at a play rate based upon the time tagged identification data to synchronize with playing of the motion picture film. In addition, the synchronizer 52a may also skip ahead or wait while playing the supplemental audio content based upon the time tagged identification data to synchronize with playing of the motion picture film. Skipping ahead, for example, may be desired where splices have been made to the motion picture film and a number of frames have been deleted, as will be appreciated by those skilled in the art.

To perform these functions, the synchronizer 52a may include a time base generator 54a for generating a time base signal based upon the time tagged identification data, and an output stage 55a for playing the supplemental audio content at a rate based upon the time base signal from the time base generator 54a. To improve synchronization, the illustrated synchronizer 52a also further comprises a time base correction controller 56a for adjusting the time base generator 54a based upon the time tagged identification data. In other words, the time base correction controller 56a may provide feedback control to follow the rate of playing of the motion picture film 34a which can vary. The playing rate may be varied slightly without causing undesired changes in pitch of supplemental audio content as will be appreciated by those skilled in the art.

Turning now to the bottom portion of FIG. 3, preprocessing steps as may enhance synchronization are now described. Such preprocessing may be performed by the preprocessor 60a. The preprocessor 60a may be implemented in the server 41 (FIG. 2) or in the personal computer 40a, or the functions may be shared, as will be appreciated by those skilled in the art. The preprocessing may also be performed by the originating source prior to delivery to the cineplex 20 in other embodiments.

The illustrated preprocessor 60a is for preprocessing the supplemental audio content to identify quiet portions between adjacent live portions. Since the supplement audio content is preferably spoken words, e.g. dialogue or descriptive narration, there are typically pauses between words, or between phrases or sentences. These pauses, for example, define quiet portions which can be extended or reduced in order to aid synchronization during playing. As an example, a quiet portion may be identified as occurring between reel X, and between block numbers Y and Y+75. Of course, quiet portions can be considerably longer or shorter as will be appreciated by those skilled in the art.

Once identified during preprocessing and associated with the identification information that is also used on the motion picture film or which can be correlated therewith, these quiet portions can be extended or reduced by the illustrated sample formatter 57a. Of course, by reduced is also meant to include the complete reduction or elimination of a quiet portion, and extended is meant to cover the creation of a quiet portion. To reduce noise which may otherwise be generated, the sample formatter 57a may hold a prior sample during extension of a quiet portion as will be appreciated by those skilled in the art.

The preprocessor 60a illustratively includes a first memory 61a for storing the downloaded supplemental audio content. The supplemental audio content is upsampled in the illustrated upsampler 62a to match the desired play sample rate. The supplemental audio content is then processed to determine quiet portions and their locations in the illustrated quiet portion processor and tagger 63a. This quiet portion processor and tagger 63a can be provided by the microprocessor of the portable computer 40a of the projection area, or the common server 41 as will be appreciated by those skilled in the art. This preprocessed supplemental audio content may then be stored in the second memory 64a for use during playing. This second memory 64a may typically be the hard drive of the portable computer 40a associated with the projection room. Of course, the preprocessed supplement audio content can also be stored in the first memory along with the downloaded content, or in place of the downloaded content.

Figure 4:
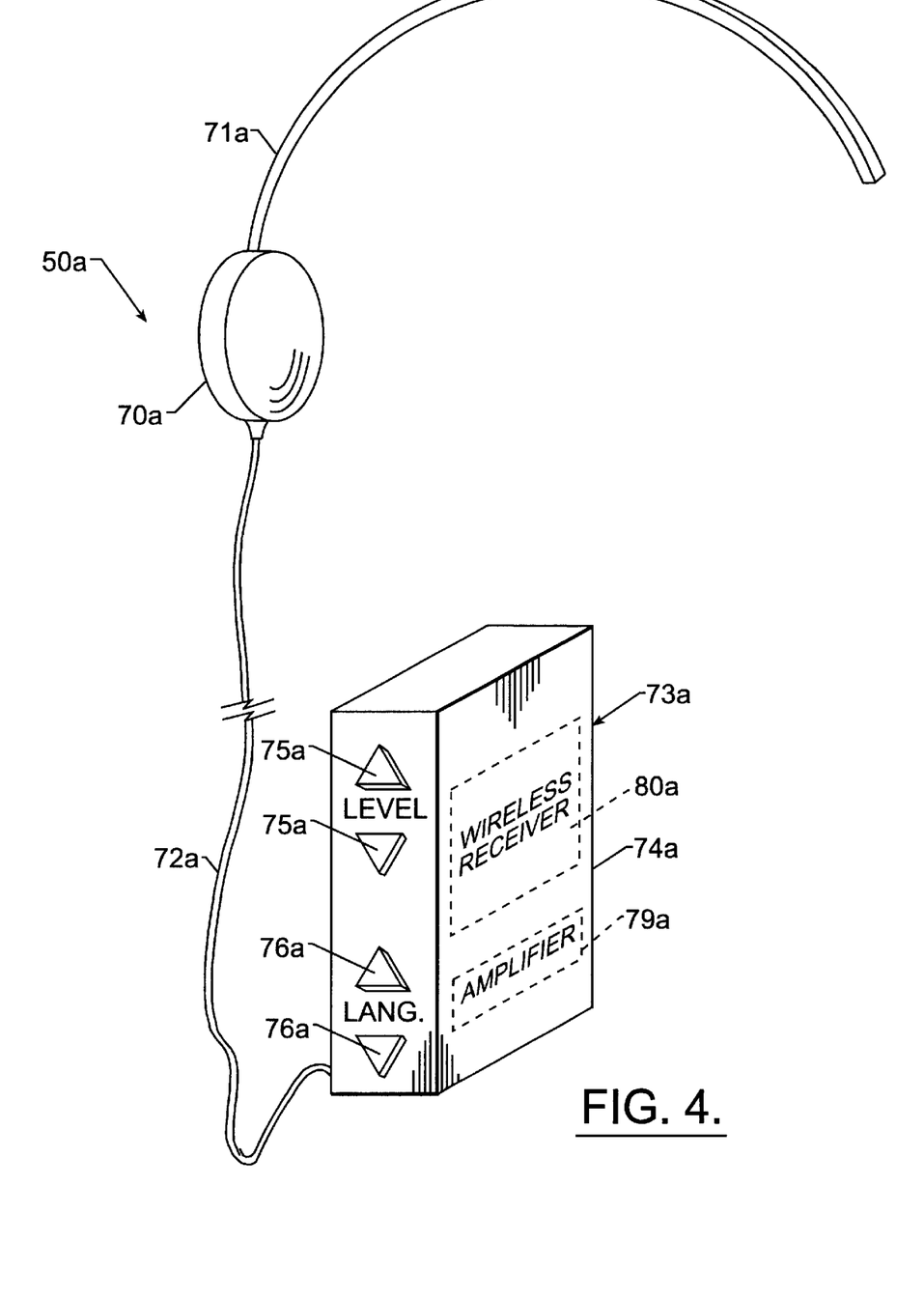
FIG. 4 is a perspective view of an embodiment of a movie patron unit of the supplemental audio system as shown in FIG. 2.

Turning now to FIG. 4, a movie patron unit 50a for the supplemental audio content system 30a is now described. The movie patron unit 50a delivers the supplemental audio content to the movie patron. The illustrated movie patron unit 50a includes an earphone 70a connected to a headband 71a to be worn on the head of the movie patron. In other embodiments, a pair of earphones may be provided. Also, the headband 71a may not be needed in other embodiments where the earphone 70a is otherwise attachable adjacent the movie patron's ear. The earphone 70a may be an open field earphone that allows the patron to hear the music, sound effects, main dialogue, etc. from the main soundtrack, while also hearing the supplemental audio content from the earphone.

The earphone 70a is connected to an associated device 73a via a cable 72a. The device 73a may include a housing 74a containing associated electronics, such as an amplifier 79a and may also carry level setting switches 75a on a portion of the housing. A battery, not shown, may also be carried by the housing 74a. Where the supplemental audio content is an alternate language, selector switches 76a may be used to allow the movie patron to select the desired alternate language. In other embodiments, the device 73a may be constructed or arranged together with the earphone 70a, such as part of a headset, for a more compact arrangement.

In some other embodiments, such as for construction of a new cinema, wiring may be run to each movie seating position, so that the movie patron unit 50a may be a simple headset which plugs into a suitable jack at the seating position. It should be recognized by those skilled in the art, however, that retrofitting such extensive wiring to an existing cinema may be cost prohibitive. Accordingly, another aspect of the supplemental audio content system 30a is that a wireless communications link may be used instead of wired links to each movie seat position. Thus, the device 73a may include a wireless receiver 80a carried within the housing 74a as will be described in greater detail below. Moreover, since motion pictures are typically now shown in cineplexes 20 including multiple cinemas 21a–21d, it is also highly desirable that interference be suppressed between adjacent systems using wireless communications links.

Figure 5:
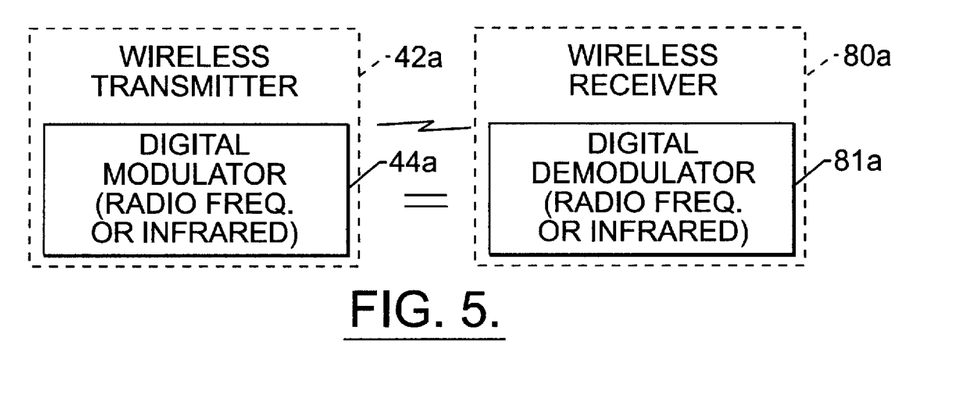
FIG. 5 is a schematic diagram of a wireless transmitter and receiver as may be used in the supplemental audio system of FIG. 2.
Figure 6:
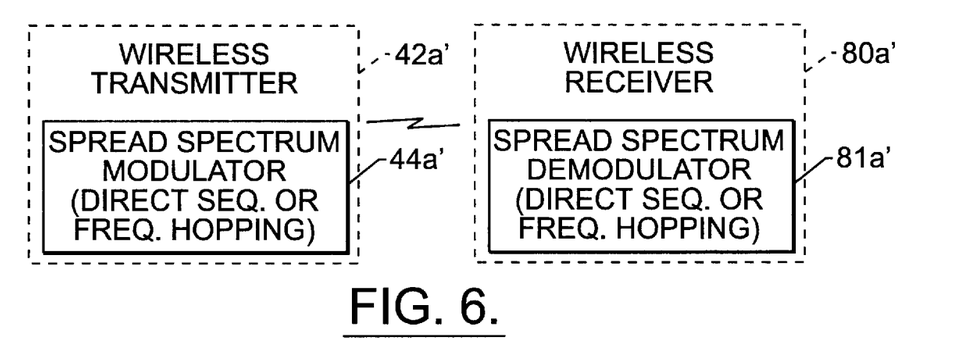
FIG. 6 is a schematic diagram of another wireless transmitter and receiver as may be used in the supplemental audio system of FIG. 2.
Figure 7:
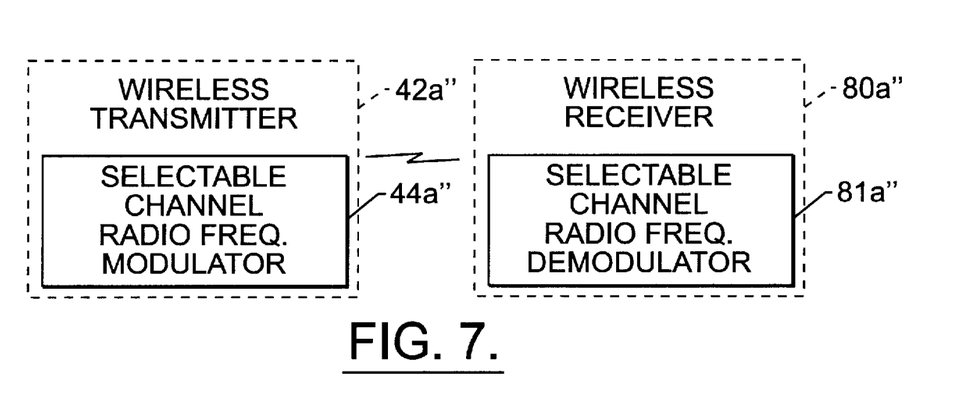
FIG. 7 is a schematic diagram of yet another wireless transmitter and receiver as may be used in the supplemental audio system of FIG. 2.

Referring now additionally to FIGS. 5–7, various embodiments of wireless transmitters and receivers for implementing wireless communications links are now described. In particular as shown in FIG. 5, to reduce interference, the wireless transmitter 42a may include a digital modulator 44a. Correspondingly, the wireless receiver 80a may include a digital demodulator 81a. For example, the digital modulator and demodulator may operate over radio frequency bands or in the infrared band.

Infrared operation offers the advantage that infrared radiation will not pass through the walls of the cinema, therefore interference with adjacent cinemas is prevented. However, delivering the infrared signals within the cinema requires that there be no substantial blockage between the transmitter and each receiver.

RF operation offers the advantage over infrared of being less susceptible to blockage of a direct path between the transmitter and the receivers; however, RF operation may be more susceptible to interference. The digital modulation may offer advantages in avoiding interference, especially, for example, where spread spectrum modulation is used, as illustratively shown in FIG. 6. More particularly, the wireless transmitter 42a' may include a spread spectrum modulator 44a' and the wireless receiver 80a' may include a spread spectrum demodulator 81a'. The spread spectrum may be either direct sequence or frequency hopping as will be appreciated by those skilled in the art. As will also be appreciated by those skilled in the art, multiple such spread spectrum communications links can be operated adjacent one another, as in adjacent cinemas 21a–21d, without causing undesirable mutual interference.

The RF spread spectrum wireless transmitter 42a' and wireless receiver 80a' may also preferably operate in an unlicensed band, such as the 2.400 to 2.4835 GHz ISM band. The wireless link may be the same as or similar to those used for wireless LANs (WLANs) operating in accordance with the 802.11 standard as will be appreciated by those skilled in the art. As will also be understood by those skilled in the art, other unlicensed bands are also available. Operation in an unlicensed band offers the advantage of not requiring application for and approval of government operating licenses for the cineplex.

Turning now to FIG. 7, another embodiment of wireless communications link is explained. In this embodiment, the wireless transmitter 42a" includes a selectable channel RF modulator 44a". Correspondingly, the wireless receiver 80a" includes a selectable channel RF demodulator 81a" that is set to the same channel as the transmitter. Accordingly, operation at different frequencies, or at different polarizations or other codings, for example, can be used to provide multiple channels within the cineplex 20 that are less likely to interfere with one another. Of course, those of skill in the art will appreciate other equivalent wireless communications schemes that provide reduced interference, but provide the advantages of wireless communications.

One method aspect in accordance with the invention is for providing supplemental audio content during playing of a motion picture film including identification data thereon. The method preferably comprises generating time tagged identification data based upon a clock and the identification data from the motion picture film during playing thereof, and synchronizing playing of the supplemental audio content with playing of the motion picture film and based upon the time tagged identification data. Synchronizing may comprise playing the supplemental audio content at a play rate based upon the time tagged identification data to synchronize with playing of the motion picture film. In addition, synchronizing may skip ahead or wait while playing the supplemental audio content based upon the time tagged identification data to synchronize with playing of the motion picture film.

Another method aspect of the invention is for delivering supplemental audio content to at least one movie patron during playing of a motion picture film and associated soundtrack in a cinema of cineplex 20 comprising a plurality of individual cinemas 21*a*–21*d*. The method may include providing at least one movie patron unit 50*a* comprising an earphone 70*a* and a wireless receiver 80*a* connected thereto, and wirelessly transmitting the supplemental audio content from a wireless transmitter to the at least one movie patron unit 50*a* to thereby deliver supplemental audio content to the at least one movie patron. Moreover, the wireless transmitter and wireless receiver 42*a*, 80*a* (FIG. 5); 42', 80*a*' (FIG. 6); and 42*a*", 80*a*" (FIG. 7) may have operating characteristics to avoid interference with respective supplemental audio content systems for other cinemas of the cineplex 20 (FIG. 1).

In addition, other features relating to supplemental audio content systems are disclosed in copending patent application filed concurrently herewith and assigned to the assignee of the present invention and entitled SUPPLEMENTAL AUDIO CONTENT SYSTEM WITH WIRELESS COMMUNICATION FOR A CINEMA AND RELATED METHODS, Ser. No. 09/896,894, the entire disclosure of which is incorporated herein in its entirety by reference. Therefore, it is to be understood that the invention is not to be limited to the specific embodiments disclosed, and that modifications and embodiments are intended to be included within the scope of the appended claims.

That which is claimed is:

1. A supplemental audio content system for providing supplemental audio content during playing of a motion picture film and associated soundtrack, the motion picture film including identification data thereon, the supplemental audio content system comprising:
   a storage device for storing the supplemental audio content;
   a clock;
   a time tagger cooperating with said clock for generating time tagged identification data based upon the identification data from the motion picture film during playing thereof;
   a preprocessor for preprocessing the supplemental audio content to identify quiet portions between adjacent live portions; and
   a synchronizer for synchronizing playing of the supplemental audio content with playing of the motion picture film and associated soundtrack and based upon the time tagged identification data, said synchronizer comprising a sample formatter for extending or reducing quiet portions during playing of the supplemental audio content.

2. A supplemental audio content system according to claim 1 wherein the supplemental audio content comprises spoken words devoid of music and sound effects.

3. A supplemental audio content system according to claim 1 wherein the supplemental audio content comprises alternate language audio content.

4. A supplemental audio content system according to claim 1 wherein the supplemental audio content comprises descriptive narrative audio content.

5. A supplemental audio content system according to claim 1 wherein said synchronizer plays the supplemental audio content at a play rate based upon the time tagged identification data to synchronize with playing of the motion picture film.

6. A supplemental audio content system according to claim 1 wherein said synchronizer comprises:
   a time base generator for generating a time base signal based upon the time tagged identification data; and
   an output stage for playing the supplemental audio content at a rate based upon the time base signal.

7. A supplemental audio content system according to claim 6 wherein said synchronizer further comprises a time base correction controller for adjusting said time base generator based upon the time tagged identification data.

8. A supplemental audio content system according to claim 1 wherein said synchronizer skips ahead while playing the supplemental audio content based upon the time tagged identification data to synchronize with playing of the motion picture film.

9. A supplemental audio content system according to claim 1 wherein said synchronizer waits while playing the supplemental audio content based upon the time tagged identification data to synchronize with playing of the motion picture film.

10. A supplemental audio content system according to claim 1 wherein said sample formatter holds a prior sample during extension of a quiet portion.

11. A supplemental audio content system according to claim 1 further comprising an interface for downloading the supplemental audio content via the Internet.

12. A supplemental audio content system according to claim 1 further comprising an interface for downloading the supplemental audio content via satellite.

13. A supplemental audio content system according to claim 1 further comprising an interface for downloading the supplemental audio content via a point-to-point communications link.

14. A supplemental audio content system according to claim 1 further comprising a plurality of earphones to be worn by movie patrons and operatively connected to said synchronizer.

15. A supplemental audio content system according to claim 14 further comprising a wireless transmitter connected to said synchronizer and at least one wireless receiver connected to said plurality of earphones.

16. A supplemental audio content system according to claim 14 wherein said plurality of earphones comprises a plurality of open field earphones.

17. A supplemental audio content system for providing supplemental audio content during playing of a motion picture film and associated soundtrack, the motion picture film including identification data thereon, the supplemental audio content system comprising:
   a storage device for storing the supplemental audio content, the supplemental audio content comprising spoken words devoid of music and sound effects;
   a clock;
   a time tagger cooperating with said clock for generating time tagged identification data based upon the identification data from the motion picture film during playing thereof;
   a preprocessor for preprocessing the supplemental audio content to identify quiet portions between adjacent live portions: and
   a synchronizer for synchronizing playing of the supplemental audio content with playing of the motion picture film and associated soundtrack and based upon the time tagged identification data, said synchronizer comprising
      a time base generator for generating a time base signal based upon the time tagged identification data, an output stage for playing the supplemental audio content at a rate based upon the time base signal, and a sample formatter for extending or reducing quiet portions during playing of the supplemental audio content.

18. A supplemental audio content system according to claim 17 wherein the supplemental audio content comprises at least one of alternate language audio content, and descriptive narrative audio content.

19. A supplemental audio content system according to claim 17 wherein said synchronizer further comprises a time base correction controller for adjusting said time base generator based upon the time tagged identification data.

20. A supplemental audio content system according to claim 17 wherein said synchronizer skips ahead while playing the supplemental audio content based upon the time tagged identification data to synchronize with playing of the motion picture film.

21. A supplemental audio content system according to claim 17 wherein said synchronizer waits while playing the supplemental audio content based upon the time tagged identification data to synchronize with playing of the motion picture film.

22. A supplemental audio content system according to claim 17 wherein said sample formatter holds a prior sample during extension of a quiet portion.

23. A supplemental audio content system according to claim 17 further comprising an interface for downloading the supplemental audio content via at least one of the Internet, a satellite and a point-to-point communications link.

24. A supplemental audio content system according to claim 17 further comprising a plurality of earphones to be worn by movie patrons and operatively connected to said synchronizer.

25. A supplemental audio content system according to claim 24 further comprising a wireless transmitter connected to said synchronizer and at least one wireless receiver connected to said plurality of earphones.

26. A supplemental audio content system for providing supplemental audio content during playing of a motion picture film and associated soundtrack, the motion picture film including identification data thereon, the supplemental audio content system comprising:

a storage device for storing the supplemental audio content, the supplemental audio content comprising spoken words devoid of music and sound effects;

a preprocessor for preprocessing the supplemental audio content to identify quiet portions between adjacent live portions; and a synchronizer for synchronizing playing of the supplemental audio content with playing of the motion picture film and associated soundtrack, said synchronizer comprising a sample formatter for extending or reducing quiet portions during playing of the supplemental audio content.

27. A supplemental audio content system according to claim 26 wherein the supplemental audio content comprises at least one of alternate language audio content, and descriptive narrative audio content.

28. A supplemental audio content system according to claim 26 wherein said sample formatter holds a prior sample during extension of a quiet portion.

29. A supplemental audio content system according to claim 30 further comprising:

a clock; and a time tagger cooperating with said clock for generating time tagged identification data based upon the identification data from the motion picture film during playing thereof.

30. A supplemental audio content system according to claim 26 further comprising an interface for downloading the supplemental audio content via at least one of the Internet, a satellite and a point-to-point communications link.

31. A supplemental audio content system according to claim 26 further comprising a plurality of earphones to be worn by movie patrons and operatively connected to said synchronizer.

32. A supplemental audio content system according to claim 21 further comprising a wireless transmitter connected to said synchronizer and at least one wireless receiver connected to said plurality of earphones.

33. A method for providing supplemental audio content during playing of a motion picture film and associated soundtrack, the motion picture film including identification data thereon, the method comprising:

generating time tagged identification data based upon a clock and based upon the identification data from the motion picture film during playing thereof;

preprocessing the supplemental audio content to identify quiet portions between adjacent live portions; and synchronizing playing of supplemental audio content with playing of the motion picture film and associated soundtrack and based upon the time tagged identification data.

34. A method according to claim 33 wherein the supplemental audio content comprises spoken words devoid of music and sound effects.

35. A method according to claim 33 wherein the supplemental audio content comprises alternate language audio content.

36. A method according to claim 33 wherein the supplemental audio content comprises descriptive narrative audio content.

37. A method according to claim 33 wherein synchronizing comprises playing the supplemental audio content at a play rate based upon the time tagged identification data to synchronize with playing of the motion picture film.

38. A method according to claim 37 wherein synchronizing comprises:

generating a time base signal based upon the time tagged identification data; and playing the supplemental audio content at a rate based upon the time base signal.

39. A method according to claim 33 wherein synchronizing skips ahead while playing the supplemental audio content based upon the time tagged identification data to synchronize with playing of the motion picture film.

40. A method according to claim 33 wherein synchronizing waits while playing the supplemental audio content based upon the time tagged identification data to synchronize with playing of the motion picture film.

41. A method according to claim 33 further comprising downloading the supplemental audio content via at least one of the Internet, a satellite and a point-to-point communications link.

42. A method according to claim 33 further comprising delivering the supplemental audio content to movie patrons using a plurality of earphones.

43. A method according to claim 42 further comprising wirelessly transmitting signals to the plurality of earphones.

44. A method according to claim 42 wherein the plurality of earphones comprises a plurality of open field earphones.

* * * * *